US010024294B2

(12) United States Patent
Onozato et al.

(10) Patent No.: US 10,024,294 B2
(45) Date of Patent: Jul. 17, 2018

(54) CONTROL DEVICE FOR INTERNAL COMBUSTION ENGINE FOR VEHICLE

(71) Applicant: Nissan Motor Co., Ltd., Yokohama-shi, Kanagawa (JP)

(72) Inventors: Naoya Onozato, Kanagawa (JP); Yasushi Ohmura, Kanagawa (JP); Yozaburo Aoki, Kanagawa (JP); Hiromichi Sato, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/577,316

(22) PCT Filed: May 29, 2015

(86) PCT No.: PCT/JP2015/065635
§ 371 (c)(1),
(2) Date: Nov. 27, 2017

(87) PCT Pub. No.: WO2016/194068
PCT Pub. Date: Dec. 8, 2016

(65) Prior Publication Data
US 2018/0156181 A1 Jun. 7, 2018

(51) Int. Cl.
*B60T 7/12* (2006.01)
*F02P 5/15* (2006.01)
(Continued)

(52) U.S. Cl.
CPC ................ *F02P 5/15* (2013.01); *F01P 11/16* (2013.01); *F02D 41/06* (2013.01); *F02D 41/12* (2013.01); *F02D 43/04* (2013.01)

(58) Field of Classification Search
CPC .............. F02B 19/1052; F02B 19/1085; F02D 35/0046; F02D 31/004; F02D 31/006;
(Continued)

(56) References Cited

U.S. PATENT DOCUMENTS

2005/0109317 A1* 5/2005 Niimi .................... F02D 19/081 123/406.45
2008/0066718 A1* 3/2008 Sato .......................... F02D 9/02 123/350
(Continued)

FOREIGN PATENT DOCUMENTS

JP S5825544 A 2/1983
JP 2011122553 A 6/2011
(Continued)

*Primary Examiner* — John Kwon
(74) *Attorney, Agent, or Firm* — Young Basile Hanlon & MacFarlane, P.C.

(57) ABSTRACT

When an accelerator opening degree becomes zero, a fuel cut-permission vehicle speed is set on the bases of a cooling water temperature. During a delay time, torque reduction has the characteristic of being dependent on cooling water temperature, and in an unwarmed state, a relatively large amount of air is supplied. The fuel cut-permission vehicle speed has the characteristic of taking a high value when an engine is not warmed up and cooling water temperature is low, in accordance with delay time air amount reduction control, which is performed in accordance with cooling water temperature. This reduces any shocks or odd feelings experienced by an occupant.

3 Claims, 6 Drawing Sheets

(51) Int. Cl.

| | |
|---|---|
| ***F02D 43/04*** | (2006.01) |
| ***F01P 11/16*** | (2006.01) |
| ***F02D 41/06*** | (2006.01) |
| ***F02D 41/12*** | (2006.01) |

(58) Field of Classification Search

CPC .... F02D 31/007; F02D 13/06; F02D 41/0087; B60W 2510/0638; B60W 2510/0652; B60W 2710/0655

USPC ............ 701/101–105, 110–112; 123/406.45, 123/406.47, 406.52, 406.55, 481, 492, 123/493

See application file for complete search history.

(56) References Cited

U.S. PATENT DOCUMENTS

| | | | | |
|---|---|---|---|---|
| 2012/0253645 | A1 | 10/2012 | Hashimoto | |
| 2012/0318015 | A1 | 12/2012 | Motegi et al. | |
| 2013/0180232 | A1* | 7/2013 | Shinoda .................. | F01N 3/103<br>60/300 |
| 2016/0167666 | A1* | 6/2016 | Oohata ................. | B60W 30/19<br>477/166 |
| 2016/0272210 | A1* | 9/2016 | Matsushita ........... | B60W 10/02 |

FOREIGN PATENT DOCUMENTS

| | | | |
|---|---|---|---|
| JP | 2012197708 | A | 10/2012 |
| JP | 2013001172 | A | 1/2013 |

* cited by examiner

CONTROL DEVICE FOR INTERNAL COMBUSTION ENGINE FOR VEHICLE

TECHNICAL FIELD

This invention relates to a control device for an internal combustion engine for a vehicle which performs fuel cut during deceleration.

BACKGROUND TECHNOLOGY

It has been known that the stopping of fuel supply, that is, fuel cut is performed according to a predetermined fuel cut-permission condition when an accelerator opening degree becomes zero during traveling, to reduce fuel consumption of an internal combustion engine for a vehicle.

In Japanese Patent Application Publication 2013-1172, it has been disclosed that a vehicle speed condition is included as one of fuel cut-permission conditions. That is, it has been disclosed that when an accelerator opening degree becomes zero, fuel cut is permitted when a vehicle speed is higher than a predetermined fuel cut-permission vehicle speed.

SUMMARY

An object of the present invention is to improve further reduction of fuel consumption by fuel cut by more appropriately performing fuel cut control in a lower vehicle speed, and also improve the suppression of odd feelings experienced by an occupant.

The present invention is a control device for an internal combustion engine for a vehicle in which when an accelerator opening degree becomes zero during traveling of the vehicle, fuel cut is executed on a condition that a vehicle speed is higher than a fuel cut-permission vehicle speed after a predetermined delay time has passed, and by the present invention, it is possible to suppress odd feelings experienced by an occupant, while increasing the opportunity of the fuel cut including a case where an engine temperature is low to maximum.

DETAILED DESCRIPTION OF THE EMBODIMENTS

In the following, one embodiment of the present invention will be explained in detail based on the drawings.

Figure 1:
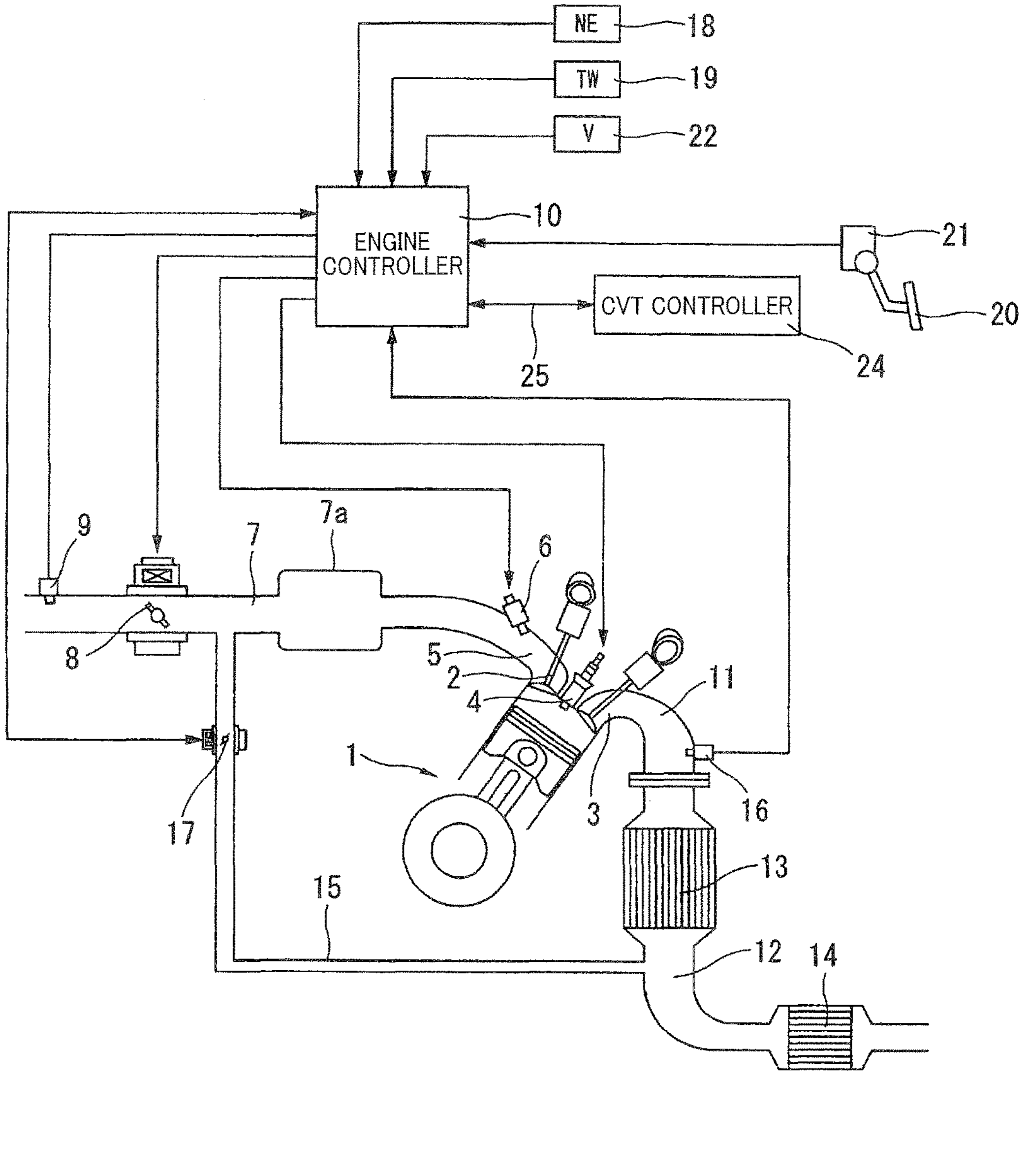
FIG. 1 is a schematic diagram showing a schematic system diagram of one embodiment of a control device according to the present invention.

FIG. 1 is a schematic diagram showing a schematic system diagram of one embodiment of the present invention. An internal combustion engine 1 mounted on a vehicle which is not shown in the drawings is, for example, a spark ignition type gasoline engine, and a pair of intake valves 2 and a pair of exhaust valves 3 are disposed on the ceiling wall surface of a combustion chamber in internal combustion engine 1, and a spark plug 4 is disposed at the middle part surrounded by these intake valves 2 and exhaust valves 3.

In each cylinder, a fuel injection valve 6 which injects fuel toward intake valve 2 is disposed in an intake port 5 which is opened and closed by intake valve 2. In addition, an electronic control type throttle valve 8 whose opening degree is controlled by a control signal from an engine controller 10 is interposed on the upstream side of a collector portion 7*a* of an intake passage 7 connected to intake port 5. An air flow meter 9 which detects the amount of inflow air is disposed on the further upstream side of throttle valve 8.

In addition, catalyst devices 13 and 14, each of which consists of three-way catalyst, are interposed on an exhaust passage 12 connected to an exhaust port 11, and on its upstream side, an air-fuel ratio sensor 16 is disposed. Moreover, the distal end of an exhaust gas recirculation passage 15 branching from exhaust passage 12 between two catalyst devices 13 and 14 is connected to the downstream side of throttle valve 8 of intake passage 7, and an exhaust gas recirculation control valve 17 is interposed on exhaust gas recirculation passage 15.

Internal combustion engine 1 is mounted on the vehicle in combination with a torque converter and a transmission which are not shown in the drawings, and drives the drive wheels of the vehicle through the transmission and a final reduction gear unit which is not shown in the drawings. As the transmission, for example, a belt type continuously variable transmission (so-called CVT) is used which is capable of continuously varying gear ratio according to an operation condition of the vehicle.

Engine controller 10 is connected with, in addition to air flow meter 9 and air-fuel ratio sensor 16, various sensors such as a crank angle sensor 18 for detecting engine speed NE, a water temperature sensor 19 that detects a cooling water temperature TW as engine temperature, an accelerator opening degree sensor 21 that detects the depression amount of an accelerator pedal 20 (that is, an accelerator opening degree APO) operated by a driver and a vehicle speed sensor 22 that detects vehicle speed V, and their detection signals are input. In addition, a CVT controller 24 that performs the gear ratio control, etc. of the continuously variable transmission is connected to engine controller 10 through an in-vehicle network 25, and transmitting and receiving of required information and signals are performed therebetween. As to the present invention, engine controller 10 receives at least gear ratio information and transmission hydraulic fluid temperature information from CVT controller 24.

Engine controller 10 controls the fuel injection amount and the injection timing of fuel injection performed by fuel injection valve 6, the ignition timing of ignition performed by spark plug 4 and the opening degree of throttle valve 8 optimally based on the various detection signals. In addition, as mentioned below, fuel cut is executed to suppress fuel consumption. The torque converter has a lock-up clutch, and is set so as to engage the lock-up clutch when the vehicle speed is, for example, 10 km/h or higher. When the lock-up clutch is engaged, the fuel cut is executed, and when the lock-up clutch is disengaged, the fuel cut is not executed.

Figure 2:
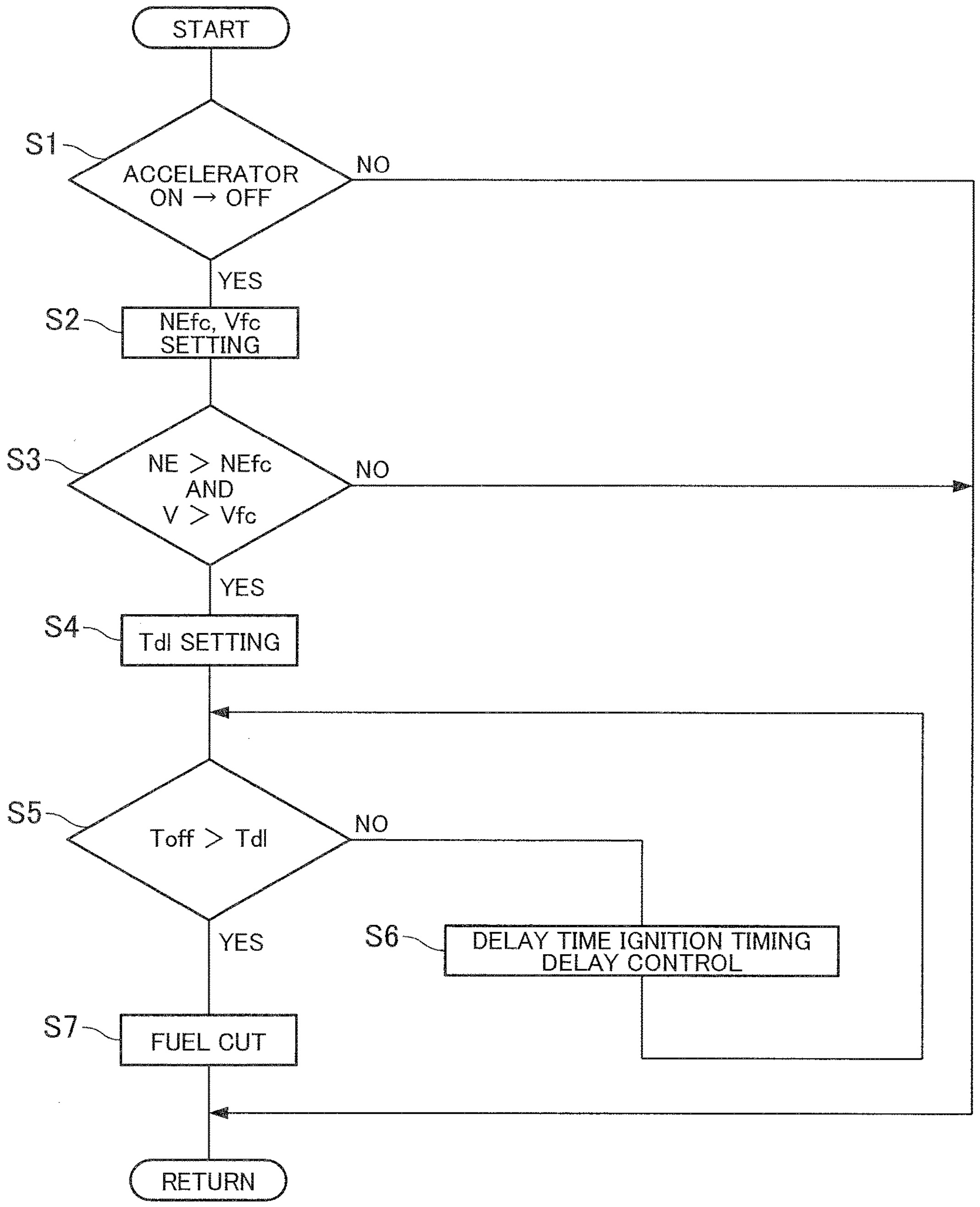
FIG. 2 is a flowchart showing a first embodiment of control during deceleration.

FIG. 2 is a flowchart showing a first embodiment of control during deceleration, which is executed by engine controller 10. Processing shown in this flowchart is one which is repeatedly executed every predetermined very short time during the operation of internal combustion engine 1, and in a step 1, it is repeatedly judged whether or not an accelerator is turned from an on-state to an off-state, that is, it is repeatedly judged whether or not accelerator opening degree APO is changed from a state except zero to zero. In a step 2, based on cooling water temperature TW at that time, a fuel cut-permission engine speed NEfc according to cooling water temperature TW and a fuel cut-permission vehicle speed Vfc according to cooling water temperature TW are set.

Then, in a step 3, as a fuel cut condition, it is judged whether or not two conditions of "engine speed NE higher than fuel cut-permission engine speed NEfc" and "vehicle speed V higher than fuel cut-permission vehicle speed Vfc" are satisfied simultaneously. Here, in a case of NO, the fuel cut is not executed.

Figure 3:
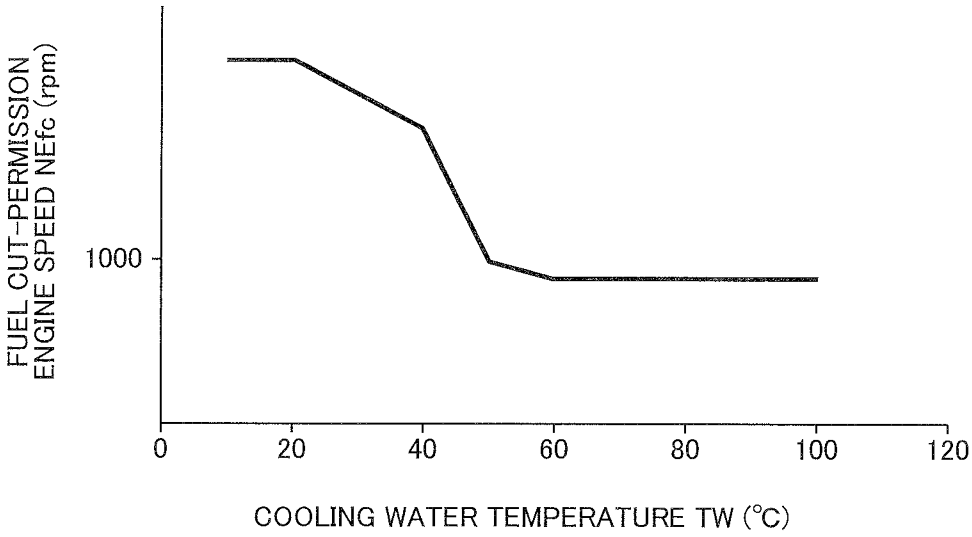
FIG. 3 is a characteristic diagram showing the characteristic of a fuel cut-permission engine speed to cooling water temperature.
Figure 4:
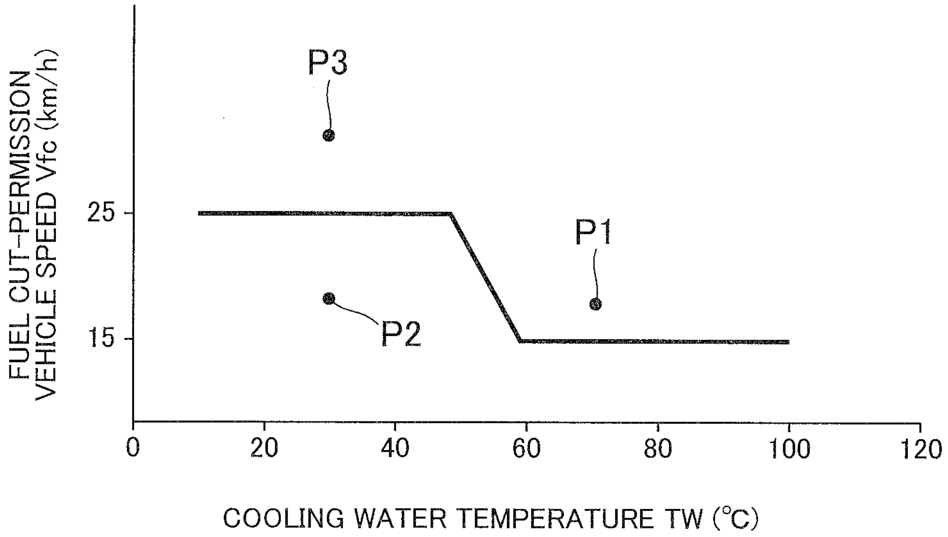
FIG. 4 is a characteristic diagram showing the characteristic of a fuel cut-permission vehicle speed to the cooling water temperature.

FIG. 3 shows the characteristic of fuel cut-permission engine speed NEfc to cooling water temperature TW. As shown in FIG. 3, when the engine is not warmed up (for example, cooling water temperature TW is lower than 50° C.), fuel cut-permission engine speed NEfc is set high to avoid engine stall because the viscosity of oil is high. FIG. 4 shows the characteristic of fuel cut-permission vehicle speed Vfc to cooling water temperature TW, and when the engine is not warmed up, fuel cut-permission vehicle speed Vfc is also set high. A fuel cut-permission engine speed table in which the value of fuel cut-permission engine speed NEfc has been previously assigned using cooling water temperature TW as a parameter and a fuel cut-permission vehicle speed table in which the value of fuel cut-permission vehicle speed Vfc has been previously assigned using cooling water temperature TW as a parameter are provided in the respective memories of engine controller 10, and in the step 2, by referring to these tables, fuel cut-permission engine speed NEfc and fuel cut-permission vehicle speed Vfc in accordance with cooling water temperature TW at that time are set. As to the characteristic of fuel cut-permission vehicle speed Vfc in FIG. 4, it will be further mentioned below.

If the judgement in the step 3 is YES, the step proceeds to a step 4, and a delay time Td1 is set which is required for the smooth lowering of torque until the fuel is cut. Throttle valve 8 is closed to a valve opening degree at which idle rotation can be maintained, interlocking with the accelerator. When throttle valve 8 is closed, by the response delay of air existing in collector portion 7*a*, the amount of air entering into the engine cylinder is reduced with a delay. Delay time Td1 is set in consideration of this delay. That is, after the delay time has passed, the engine torque becomes torque according to the valve opening degree of throttle valve 8 at which the idle rotation is maintained. This delay time Td1 is calculated based on engine speed NE, an engine load, vehicle speed V, the gear ratio of the continuously variable transmission and the transmission hydraulic fluid temperature at the point of time when accelerator opening degree APO becomes zero (strictly, immediately before it). In other words, immediately before the accelerator opening degree APO becomes zero, optimal delay time Td1 is set in consideration of output applied to the vehicle by internal combustion engine 1, the travel resistance of the vehicle and the internal resistance of a drive system including the continuously variable transmission. The length of delay time Td1 is from approximately 500 milliseconds to approximately 1 second.

In a step 5, it is judged whether or not an elapsed time Toff from the detecting of the turning of the accelerator to the off-state in the step 1 becomes delay time Td1 or more. In a case of NO, the step proceeds to a step 6, and during delay time Td1, delay time ignition timing delay control is executed for gradually delaying ignition timing in accordance with a predetermined characteristic so as to support the lowering of the torque. Then, the step returns to the step 5, and it is repeatedly judged whether or not elapsed time Toff becomes delay time Td1 or more.

That is, the throttle valve is throttled, in response to the turning of the accelerator to the off-state, and the air amount is lowered with a delay. Moreover, until elapsed time Toff from the turning of the accelerator to the off-state reaches a value of delay time Td1, the ignition timing is controlled according to elapsed time Toff, and the ignition timing is gradually delayed. Here, as mentioned below, the characteristic of the delay time ignition timing delay control becomes one according to cooling water temperature TW. In addition, as the fuel injection, an amount of fuel injection, according to the air amount, is performed. Therefore, during delay time Td1, the combustion operation of internal combustion engine 1 is maintained.

When it is judged that elapsed time Toff reaches delay time Td1 in the step 5, the step proceeds to a step 7, and the stop of the fuel injection, that is, the fuel cut is executed.

In addition, after the fuel cut, by a routine which is not shown in the drawings, it is repeatedly judged whether or not a predetermined fuel cut recovery condition is satisfied. When the fuel cut recovery condition is satisfied, the fuel injection is restarted.

Figure 6:
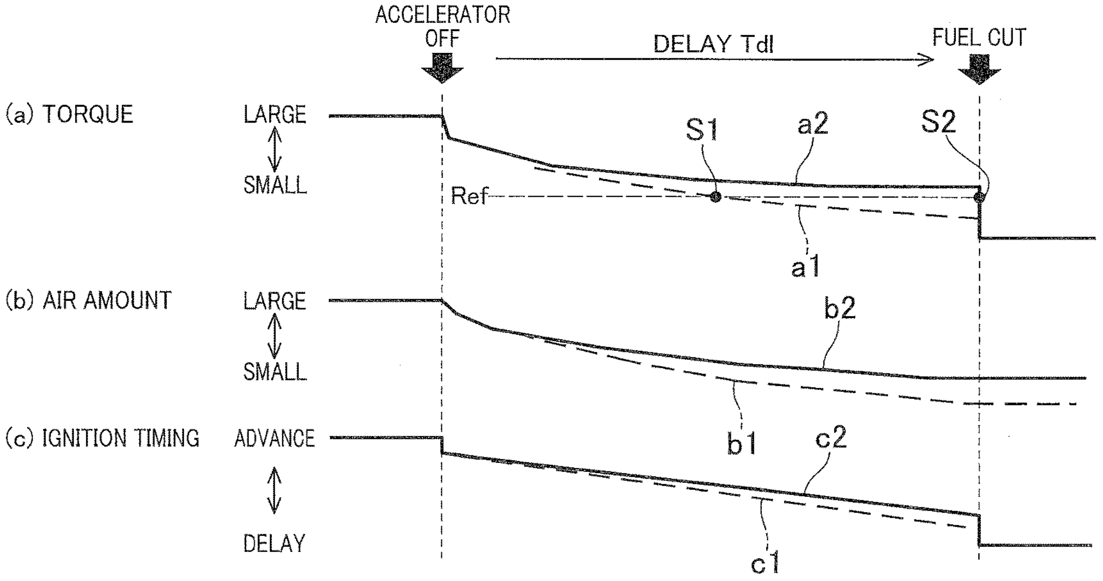
FIG. 6 is a time chart in which respective shifts in (a) engine torque, (b) air amount and (c) ignition timing, in a response to the turning of an accelerator to an off-state, are compared between after the warming-up of an engine is completed and before the engine is warmed up, and shown.

FIG. 6 is a time chart in which respective shifts in (a) engine torque, (b) air amount and (c) ignition timing, in the response to the turning of the accelerator to the off-state, are compared between after the warming-up of the engine is completed and before the engine is warmed up, and shown. In each of them, a broken line shows a characteristic after the warming-up of the engine is completed (for example, cooling water temperature TW is 70° C.), and a solid line shows the characteristic of an unwarmed state (for example, cooling water temperature TW is 30° C.).

As mentioned above, during delay time Td1 from the turning of the accelerator to the off-state to the execution of the fuel cut, throttle valve 8 is closed to a certain opening degree at which the idle rotation can be maintained. The air amount is, as a result, gradually lowered to an air amount according to this opening degree. As to the opening degree of throttle valve 8 at the time when the accelerator is in the off-state, while the engine is warmed up, it is set so that the engine speed becomes approximately 1200 rpm, and after the warming-up of the engine is completed, it is set so that the engine speed becomes approximately 850 rpm. With this, after the warming-up of the engine is completed, the lowering of the air amount shifts as shown by a broken line b1, and it is quickly lowered compared with a broken line b2 showing a shift in the air amount when the engine is not warmed up.

Figure 5:
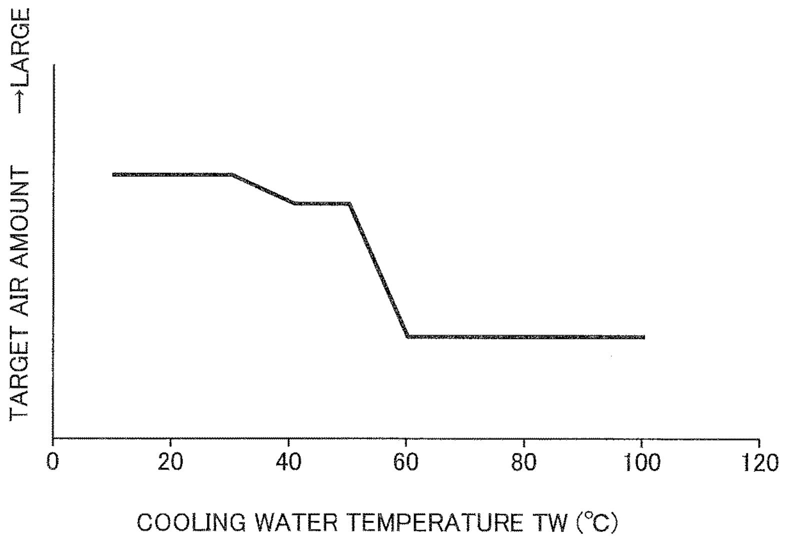
FIG. 5 is a characteristic diagram showing the characteristic of a target air amount at the time of fuel cut to the cooling water temperature.

FIG. 5 shows one example of a target air amount at the time when the accelerator is in the off-state to cooling water temperature TW. As shown in FIG. 5, in one example, if cooling water temperature TW is 60° C. or higher, it is regarded as the state after the warming-up of the engine is completed, and the target air amount at the time of the fuel cut is a relatively low air amount (an air amount at the time when throttle valve 8 is fully closed, that is, equivalent to an air amount for idling), and if cooling water temperature TW is less than 50° C., it is regarded as the unwarmed state, and the target air amount at the time of the fuel cut becomes a relatively large air amount (an air amount at the time when throttle valve 8 is slightly opened, that is, equivalent to an air amount for fast idling). Specifically, when the cooling water temperature is 20° C., the target air amount is set so that the engine speed becomes approximately 1200 rpm, and when the cooling water temperature is 60° C. or higher, the target air amount is set so that the engine speed becomes approximately 850 rpm.

The delay time ignition timing delay control is performed to delay the ignition timing during the delay time to quicken the responsiveness of the torque lowering by the turning of the accelerator to the off-state (because torque reduction with the lowering of the air amount is slow). The ignition timing is corrected to be delayed to lower the torque during delay time Td1. However, when the engine is not warmed up, as shown by a solid line c2, the ignition timing becomes a relatively advance side compared with the state after the warming-up of the engine is completed (broken line c1), because a delay limit determined from a viewpoint of, for example, the deterioration of operation becomes an advance side. In addition, in FIG. 6, the air amount is different in accordance with cooling water temperature TW. However, when compared with the same air amount and engine speed, the ignition timing when the engine is not warmed up is controlled to the relatively advance side, as compared with the ignition timing after the warming-up of the engine is completed.

In this way, the air amount and the ignition timing during delay time Td1 are controlled to have the respective characteristics of being dependent on cooling water temperature TW, and as a result, the torque generated by the combustion of internal combustion engine 1 shifts as shown by the broken line a1 after the warming-up of the engine is completed. However, with respect to the shift, when the engine is not warmed up, the torque shifts with a relatively high value as shown by a solid line a2. In either case, when the fuel cut is executed after passing delay time Td1, the torque generated by the combustion of internal combustion engine 1 is lowered to zero. Consequently, a torque level difference caused by the execution of the fuel cut in the unwarmed state becomes larger than a torque level difference caused by the execution of the fuel cut after the warming-up of the engine is completed. In addition, as a difference in the torque based on cooling water temperature TW, a difference in the air amount based on cooling water TW is dominant, and a difference in the torque caused by a difference in the ignition timing is relatively small.

In addition, a torque inversion reference value Ref added to the column of (a) engine torque in FIG. 6 schematically shows a level of the torque generated by the combustion of internal combustion engine 1 at the time when the torque transmitted from internal combustion engine 1 to the drive wheels side is inverted from positive to negative when the engine torque is lowered during the traveling of the vehicle. In other words, this is a level of combustion torque at which internal combustion engine 1 starts absorbing the torque as so-called engine brake action. The friction loss of the drive system including internal combustion engine 1 exists, and in a level at which the combustion torque is higher than zero, the torque transmitted from internal combustion engine 1 to the drive wheels side becomes zero, and when the combustion torque is further lowered, the torque transmitted from internal combustion engine 1 to the drive wheels side becomes negative. Consequently, due to the positive and negative inversion of the torque transmitted to the drive wheels side (in other words, the inversion of a transmission direction), a mechanical shock occurs caused by, for example, the backlash of meshing gears in the transmission.

Here, in the torque characteristic in delay time Td1 after the warming-up of the engine is completed (broken line a1), as shown in a point S1, in general, the torque transmitted to the drive wheels side is inverted from positive to negative at a certain point in time before the fuel cut is executed. Consequently, the torque shock generated by the torque level difference caused by the execution of the fuel cut and the mechanical shock caused by the positive and negative inversion of the torque transmitted to the drive wheels side occur with a slight time difference.

In contract to this, in the torque characteristic in delay time Td1 when the engine is not warmed up (solid line a2), as mentioned above, since the torque becomes relatively higher than the torque after the warming-up of the engine is completed, there is a case where the torque is not lowered to torque inversion reference value Ref during delay time Td1. That is, there is a case where the torque transmitted to the drive wheels side is kept positive until the fuel cut is executed. In this case, as shown in a point S2, the torque transmission direction is inverted by the execution of the fuel cut, and consequently, the torque shock generated by the torque level difference caused by the execution of the fuel cut and the mechanical shock caused by the positive and negative inversion of the torque transmitted to the drive wheels side occur simultaneously, and it may become a larger shock.

Therefore the fuel cut when the engine is not warmed up is disadvantageous compared with the fuel cut after the warming-up of the engine is completed in two respects: the torque level difference itself is larger than the torque level difference after the warming-up of the engine is completed and the mechanical shock and the torque shock occur simultaneously. There is therefore concern that it gives odd feelings to the occupant when the fuel cut is executed.

Regarding the shock at the time of the execution of the fuel cut, in the above embodiment, by setting fuel cut-permission vehicle speed Vfc relatively high when the engine is not warmed up, any shocks or odd feelings experienced by the occupant are reduced. The characteristic diagram of FIG. 4 shows one example of the relation between fuel cut-permission vehicle speed Vfc and cooling water temperature TW in the step 2 mentioned above. This characteristic of FIG. 4 substantially corresponds to the characteristic of the target air amount at the time of the fuel cut to cooling water temperature TW shown in FIG. 5. In one example, in a region in which cooling water temperature TW is 60° C. or higher, region which is regarded as the state after the warming-up of the engine is completed, fuel cut-permission vehicle speed Vfc is set to a relatively low vehicle speed of, for example, approximately 15 km/h, and in a region in which cooling water temperature TW is less than 50° C., region which is regarded as the unwarmed state, fuel cut-permission vehicle speed Vfc is set to a relatively high vehicle speed of, for example, approximately 25 km/h. This vehicle speed is set on the bases of a vehicle speed at which the torque transmitted from internal combustion engine 1 to the drive wheels side is inverted from positive to negative during the delay time, in a case where the accelerator is turned to the off-state when the engine is not warmed up.

In this way, by setting fuel cut-permission vehicle speed Vfc in accordance with cooling water temperature TW, after the warming-up of the engine is completed, the fuel cut is permitted even if the vehicle speed is relatively low. However, in the unwarmed state that the shock at the time of the execution of the fuel cut becomes relatively large, the fuel cut is permitted only in a higher vehicle speed region. For example, when the accelerator is turned to the off-state during the traveling of the vehicle at a speed of 20 km/h, if cooling water temperature TW is 70° C. (see a point P1 in FIG. 4), the fuel cut is permitted. At this time, as mentioned above, since the torque level difference is relatively small and the mechanical shock and the torque shock occur with a slight time difference, any shocks or odd feelings experienced by the occupant are relatively small. On the other hand, when the accelerator is turned to the off-state during the traveling of the vehicle at a speed of 20 km/h, if cooling water temperature TW is 30° C. (see a point P2 in FIG. 4), the vehicle speed is lower than fuel cut-permission vehicle speed Vfc, and the fuel cut is prohibited.

In addition, even if cooling water temperature TW is 30° C., as shown by, for example, a point P3 in FIG. 4, if vehicle speed V is, for example, 40 km/h, the fuel cut is permitted. In this case, as mentioned above, the torque shock caused by the torque level difference at the time of the execution of the fuel cut and the mechanical shock caused by the inversion of the torque transmission direction occur. However, in a state in which the vehicle has traveled at a high vehicle speed V, by relatively large changes in traveling vibration and traveling resistance, the torque level difference caused by the fuel cut and the mechanical shock are masked, and the shocks experienced by the occupant are reduced. In addition, at the time of high speed traveling in such coasting, in general, the gear ratio of the continuously variable transmission is controlled so as to be small, and the torque level difference experienced by the occupant on the vehicle side becomes further small, as compared with the torque level difference generated on the internal combustion engine 1 side.

In addition, in the above embodiment, vehicle speed V is judged when the accelerator is turned to the off-state. However, delay time Td1 is relatively short, and the lowering of vehicle speed V until the fuel cut is executed is relatively small. In addition, it may be configured so that after the judgement of YES in the step 3 in FIG. 2, vehicle speed V and engine speed NE are also repeatedly judged, and when vehicle speed V and engine speed NE deviate the conditions of fuel cut-permission vehicle speed Vfc and fuel cut-permission engine speed NEfc respectively, the fuel cut is cancelled.

Therefore, according to the above embodiment, since even in the unwarmed state that cooling water temperature TW is low, when vehicle speed V is high, the fuel cut is permitted while an air amount larger the air amount after completing the warming-up of the engine is supplied during delay time Td1, the fuel cut is executed under further wider conditions, and consequently, as compared with a case where the fuel cut is prohibited across the board when the engine is not warmed up, the reduction of fuel consumption can be improved. In a case of the unwarmed state, the fuel cut is prohibited in a region where vehicle speed V is low, and the fuel cut is permitted only at the time of the high speed traveling at which the occupant hardly feels the torque level difference and the mechanical shock, and thereby odd feelings experienced by the occupant can be reduced.

Next, based on the flowchart of FIG. 7, a second embodiment of control at the time of deceleration will be explained. This second embodiment is one in which, as shown in FIG. 6, the torque at the time of the execution of the fuel cut (strictly, immediately before it) which differs in accordance with the engine temperature, that is, cooling water temperature TW is predicted from cooling water temperature TW, and fuel cut-permission vehicle speed Vfc is set in accordance with the predicted torque so that the vehicle speed becomes relatively high when the predicted torque is large.

Figure 7:
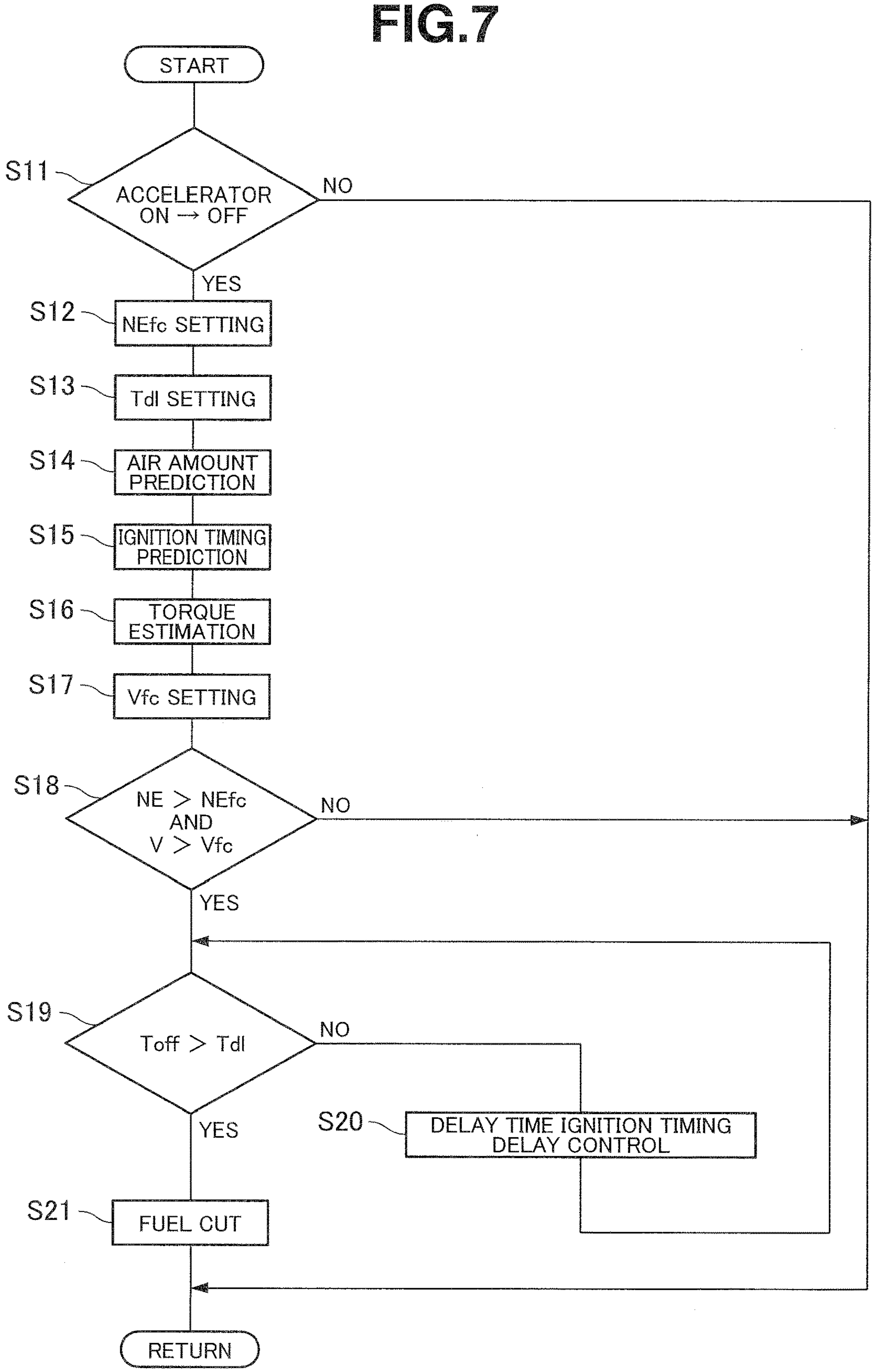
FIG. 7 is a flowchart showing a second embodiment of control during deceleration.

Processing shown in the flowchart of FIG. 7 is one which is repeatedly executed every predetermined very short time during the operation of internal combustion engine 1. In a step 11, it is repeatedly judged whether or not the accelerator is turned from an on-state to an off-state, that is, it is repeatedly judged whether or not accelerator opening degree APO is changed from a state except zero to zero. In a step 12, based on cooling water temperature TW at that time, fuel cut-permission engine speed NEfc in accordance with cooling water temperature TW is set. Similar to the first embodiment mentioned above, this is performed in reference with the fuel cut-permission engine speed table of the characteristic shown in FIG. 3.

In a step 13, delay time Td1 is set which is required for the smooth lowering of the torque until the fuel cut. This is similar to the step 4 of the first embodiment mentioned above. As mentioned below, if a fuel cut condition is satisfied, similar to the steps 5 and 6 of the first embodiment mentioned above, in steps 19 and 20, delay time ignition timing delay control is performed during delay time Td1.

In a step 14, based on cooling water temperature TW at the time when the accelerator is turned to the off-state, an air amount after delay time Td1 has passed, that is, an air amount at the time of the execution of the fuel cut (strictly, immediately before it) is predicted. This air amount corresponds to the target air amount shown in FIG. 5.

Similar to this, in a step 15, based on cooling water temperature TW at the time when the accelerator is turned to the off-state, ignition timing at the time when delay time Td1 has passed is predicted. This ignition timing is also given as a target ignition timing in accordance with cooling water temperature TW.

In a step 16, a torque at the time when delay time Td1 has passed is estimated based on the predicted air amount and ignition timing. This torque corresponds to the torque at the time of the execution of the fuel cut in FIG. 6(*a*).

Figure 8:
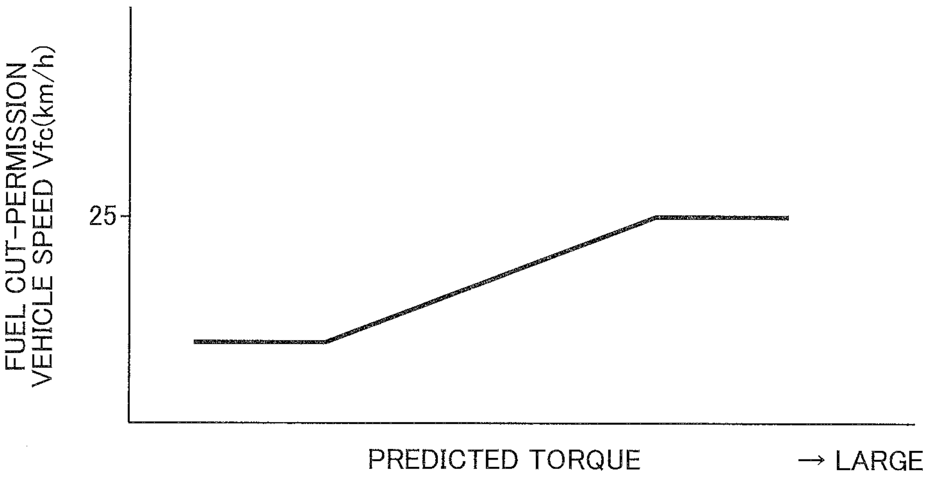
FIG. 8 is a characteristic diagram showing the characteristic of the fuel cut-permission vehicle speed to a predicted torque.

In a step 17, based on the estimated torque at the time of the execution of the fuel cut in this step 16, fuel cut permission vehicle speed Vfc is set. FIG. 8 shows one example of the characteristic of fuel cut permission vehicle speed Vfc to the estimated torque, and if the estimated torque is large, fuel cut permission vehicle speed Vfc is set high. Fuel cut permission vehicle speed Vfc is set to a relatively low vehicle speed of, for example, approximately 15 km/h with respect to a relatively small estimated torque corresponding to the torque after completing the warming-up of the engine, and fuel cut permission vehicle speed Vfc is set to a relatively high speed of, for example, approximately 25 km/h with respect to a relatively large estimated torque corresponding to the torque in the unwarmed state. In addition, the setting of this fuel cut permission vehicle speed Vfc is also performed with reference to the fuel cut-permission vehicle speed table inside the memory provided in engine controller 10.

Therefore, similar to the first embodiment mentioned above, it is possible to improve the reduction of fuel consumption by the permission of the fuel cut under a wide condition, and also possible to improve the reduction of the shocks and odd feelings experienced by the occupant.

As the above, although one embodiment of the present invention has been explained in detail, the present invention is not limited to the above embodiments, and various change can be possible. For example, in the above embodiments, cooling water temperature TW has been used as the engine temperature. However, other temperature parameters such as oil temperature can be used as the engine temperature. In addition, in each of FIG. 4 and FIG. 8, the characteristic has been simplified and shown to facilitate understanding. However, it is obvious for a person skilled in the art that there is a possibility that the characteristic becomes more complicated.

The invention claimed is:

1. A control device for an internal combustion engine for a vehicle in which when an accelerator opening degree becomes zero during traveling of the vehicle, fuel cut is executed on a condition that a vehicle speed is higher than a fuel cut-permission vehicle speed, wherein the fuel cut-permission vehicle speed is set so as to be a relatively high vehicle speed when an engine temperature is low as compared with an engine temperature after warming-up of the engine is completed.

2. The control device for the internal combustion engine for the vehicle according to claim 1, wherein the control device comprises a throttle opening degree control unit configured to set an opening degree of a throttle to an opening degree at which an air amount at which idle rotation can be maintained when the accelerator opening degree becomes zero is supplied, and wherein the throttle opening degree control unit is configured to set the opening degree of the throttle to a relatively large throttle opening degree when the engine temperature is low as compared with the engine temperature after the warming-up of the engine is completed.

3. The control device for the internal combustion engine for the vehicle according to claim 1, wherein after the accelerator opening degree becomes zero, ignition timing delay control is further executed for delaying ignition timing so as to lower torque before the fuel cut is executed, and wherein in the ignition timing delay control, the ignition timing is delayed in accordance with a characteristic according to the engine temperature so as to become a relatively advance side when the engine temperature is low as compared with the engine temperature after the warming-up of the engine is completed.

* * * * *